(12) United States Patent  (10) Patent No.: US 7,404,459 B2
Nakanishi et al.  (45) Date of Patent: Jul. 29, 2008

(54) ELECTRIC VEHICLE

(75) Inventors: Toshiaki Nakanishi, Toyohashi (JP);
Tadao Kimura, Kobe (JP)

(73) Assignee: Panasonic EV Energy Co., Ltd.,
Shizuoka (JP)

( * ) Notice: Subject to any disclaimer, the term of this patent is extended or adjusted under 35 U.S.C. 154(b) by 0 days.

(21) Appl. No.: 11/127,384

(22) Filed: May 12, 2005

(65) Prior Publication Data

US 2005/0253460 A1  Nov. 17, 2005

(30) Foreign Application Priority Data

May 12, 2004  (JP)  ............................. 2004-142760

(51) Int. Cl.
*B60K 1/00*  (2006.01)
(52) U.S. Cl. ..................... 180/65.1; 180/65.3; 180/65.8
(58) Field of Classification Search ............... 180/65.3, 180/65.1, 65.8; 318/139, 800, 801; 310/68 R, 310/268; 903/907, 919, 929, 943; 220/16 F, 220/16 D
See application file for complete search history.

(56) References Cited

U.S. PATENT DOCUMENTS

| | | | | |
|---|---|---|---|---|
| 3,728,499 A | * | 4/1973 | Bang et al. | 200/16 F |
| 3,947,391 A | * | 3/1976 | Lutzenberger | 200/16 D |
| 4,052,647 A | * | 10/1977 | Thompson | 318/139 |
| 4,121,062 A | * | 10/1978 | Fujino | 200/16 F |
| 4,324,958 A | * | 4/1982 | Valleau | 200/16 F |
| 4,491,768 A | * | 1/1985 | Slicker | 318/139 |
| 4,687,887 A | * | 8/1987 | Stokoe et al. | 200/16 F |
| 4,816,626 A | * | 3/1989 | Valenzona et al. | 200/16 F |
| 5,294,853 A | * | 3/1994 | Schluter et al. | 310/68 R |
| 5,504,414 A | * | 4/1996 | Kinoshita | 180/65.8 |
| 5,677,604 A | * | 10/1997 | Masaki et al. | 318/139 |
| 5,965,991 A | * | 10/1999 | Koike et al. | 318/139 |

FOREIGN PATENT DOCUMENTS

| | | |
|---|---|---|
| JP | 10-312733 | 11/1998 |
| JP | 2001-327001 | 11/2001 |
| JP | 2003-36776 | 2/2003 |

\* cited by examiner

*Primary Examiner*—Hau Phan
(74) *Attorney, Agent, or Firm*—Workman Nydegger

(57) ABSTRACT

A positive side main contactor serving as a contact switching device on the positive side, which is connected between a positive electrode terminal of a battery pack and a high potential input terminal of an inverter, and a negative side main contactor serving as a contact switching device on the negative side, which is connected between a negative electrode terminal of the battery pack and a low potential input terminal of the inverter, are arranged so that moving contacts of these are moved forward and backward in directions that are different from each other, e.g. by 90 degrees. Thus, a situation in which the two main contactors are simultaneously turned ON upon external impact can be avoided, and consequently, it is possible to achieve the same impact resistance as was previously possible with a smaller spring force than was previously required. Therefore, it is possible, for example, to reduce the number of turns of the winding in an electromagnetic coil of each of the main contactors or to reduce the winding diameter. The size and the cost of the contact switching device are reduced while maintaining reliability.

5 Claims, 8 Drawing Sheets

ELECTRIC VEHICLE

BACKGROUND OF THE INVENTION

1. Field of the Invention

The present invention relates to electric vehicles, such as pure electric vehicles (PEVs) and hybrid electric vehicles (HEVs), in particular hybrid electric vehicles having a fuel cell and a secondary cell, that run by converting a dc power from a battery pack, which is a driving power source mounted on such electric vehicles, into an ac power using an inverter and supplying the ac power to a motor. Moreover, the present invention particularly relates to a technique for preventing moving contacts of a positive side main contactor and a negative side main contactor that are provided between the battery pack and the inverter from being welded simultaneously.

2. Description of the Related Art

In so-called hybrid electric vehicles (HEVs) and the like that carry an engine and a motor, there is provided, between a battery pack, which is formed by combining a plurality of secondary cells, and an inverter, which is a power drive, a pair of contact switching devices (hereinafter, referred to as "main contactors") for conducting/interrupting electric power from the battery pack. These main contactors include a positive side main contactor that is provided between a positive electrode terminal of the battery pack and a high potential input terminal of the inverter and a negative side main contactor that is provided between a negative electrode terminal of the battery pack and a low potential input terminal of the inverter. See JP 2003-36776A, for example.

FIG. 8 is a lateral cross-sectional view showing the configuration of a main contactor. In FIG. 8, the main contactor is constituted by a pair of terminals 81 and 81 that are threaded. Ring terminals of wiring harnesses can be screwed thereto onto the terminal 81. The main contactor also includes a pair of terminal electrodes 81a and 81a that are brazed to tips of the pair of terminals 81 and 81, a moving contact 82 for contacting the pair of terminal electrodes 81a and 81a, a shaft spring 83 and an electromagnetic coil 84 for moving the moving contact 82 forward and backward with respect to the pair of terminal electrodes 81a and 81a.

Main contactors having such a configuration are mounted on an electric vehicle, such as a HEV, as a pair of positive side and negative side main contactors, with the directions in which the moving contacts are moved forward and backward being identical. When the main contactors are mounted on the HEV or the like, the two functions below are required for the case that the moving contacts are closed and for the case that the moving contacts are open.

First, in the case where the HEV is running and the moving contacts are closed, when the moving contacts bounce upon impact on the main contactors due to an external force (e.g., when the vehicle goes over a bump, or a collision of the vehicle), an arc occurs between the terminal electrodes and the moving contacts (hereinafter, these are simply referred to as "contacts"), and thus a part of the contacts is melted. When the contacts come into contact again, the contacts are cooled and fixed (short-circuited), and become incapable of performing the function of interrupting electric power. In order to prevent this, it is necessary to push the moving contacts against the terminal electrodes with a strong electromagnetic force.

On the other hand, in the case where the HEV is being parked and the moving contacts are open, when the contacts come into contact upon impact on the main contactors due to an external force (e.g., when another vehicle collides with the HEV), an excessive inrush current (e.g., an inrush current of 1200 A when assuming that the terminal voltage of the battery pack is 360 V and the internal resistance of the battery pack is 0.3 Ω) relative to the allowable current for the contacts flows from the battery pack to a large-capacity smoothing capacitor that is provided in the inverter. Thus the contacts are welded and become incapable of performing the function of interrupting electric power. In order to prevent this, it is necessary to push the moving contacts down off the terminal electrodes with a strong spring force.

As described above, for conventional main contactors mounted on electric vehicles such as HEVs, it was necessary to enhance both of two conflicting functions in such a way as to increase the electromagnetic force of the electromagnetic coil as well as increase the spring force of the shaft spring, in order to provide resistance against external impact for the main contactors, and thus there were problems that the sizes of the electromagnetic coil and the shaft spring are increased and the cost is increased.

SUMMARY OF THE INVENTION

The present invention is achieved in view of the above-described problems, and it is an object of the present invention to provide an electric vehicle that is equipped with a contact switching device that is designed so that the size and the cost of the contact switching device are reduced while maintaining reliability.

In order to attain the object, the electric vehicle according to the present invention is an electric vehicle that runs by converting a dc power from a battery pack that includes a plurality of secondary cells into an ac power using an inverter and supplying the ac power to a motor. The electric vehicle includes at least two contact switching devices that are provided between the battery pack and the inverter. Each of the contact switching devices includes a pair of terminal electrodes, a moving contact for contacting the pair of terminal electrodes, and moving contact driving means (e.g., a shaft spring, an electromagnetic coil, and contactor controller) for moving the moving contact forward and backward with respect to the pair of terminal electrodes. The at least two contact switching devices are arranged so that their moving contacts are moved forward and backward in different directions.

In the electric vehicle according to the present invention, it is preferable that the at least two contact switching devices include a positive side contact switching device that is connected between a positive electrode terminal of the battery pack and a high potential input terminal of the inverter, and a negative side contact switching device that is connected between a negative electrode terminal of the battery pack and a low potential input terminal of the inverter. The positive side contact switching device and the negative side contact switching device are arranged so that their moving contacts are moved forward and backward in directions that are 90 degrees or 180 degrees from each other.

With the above-described configuration, when the positive side contact switching device and the negative side contact switching device are arranged so that their moving contacts are moved forward and backward in directions that are 90 degrees from each other, the moving contacts of the positive side and the negative side contact switching devices are not welded to the terminal electrodes at the same time upon external impact, and it is possible to achieve the same impact resistance as was previously possible with a smaller spring force ($\frac{1}{2}^{1/2}$) than was previously required. Therefore, it is possible, for example, to reduce the number of turns of the winding in the electromagnetic coil or to reduce the winding diameter, and the size and the cost of the contact switching device can be reduced while maintaining the reliability of the contact switching device.

Moreover, when the positive side contact switching device and the negative side contact switching device are arranged so that their moving contacts are moved forward and backward in directions that are 180 degrees from each other, that is to say, when they are arranged in opposite orientations, it is possible to achieve the same impact resistance as was previously possible with a very small spring force that is required for pushing back the moving contact from the terminal electrodes quickly.

BRIEF DESCRIPTION OF THE DRAWINGS

FIG. 3 is a timing chart of a precharge contactor starting control signal S1, a positive side main contactor starting control signal S2, a negative side main contactor starting control signal S3, an ignition key signal S4, and an inverter side voltage Vinv when an ignition key 11 is ON.

DESCRIPTION OF THE PREFERRED EMBODIMENTS

Hereinafter, preferred embodiments of the present invention will be described with reference to the drawings, taking a hybrid electric vehicle (HEV) as an example.

Figure 1:
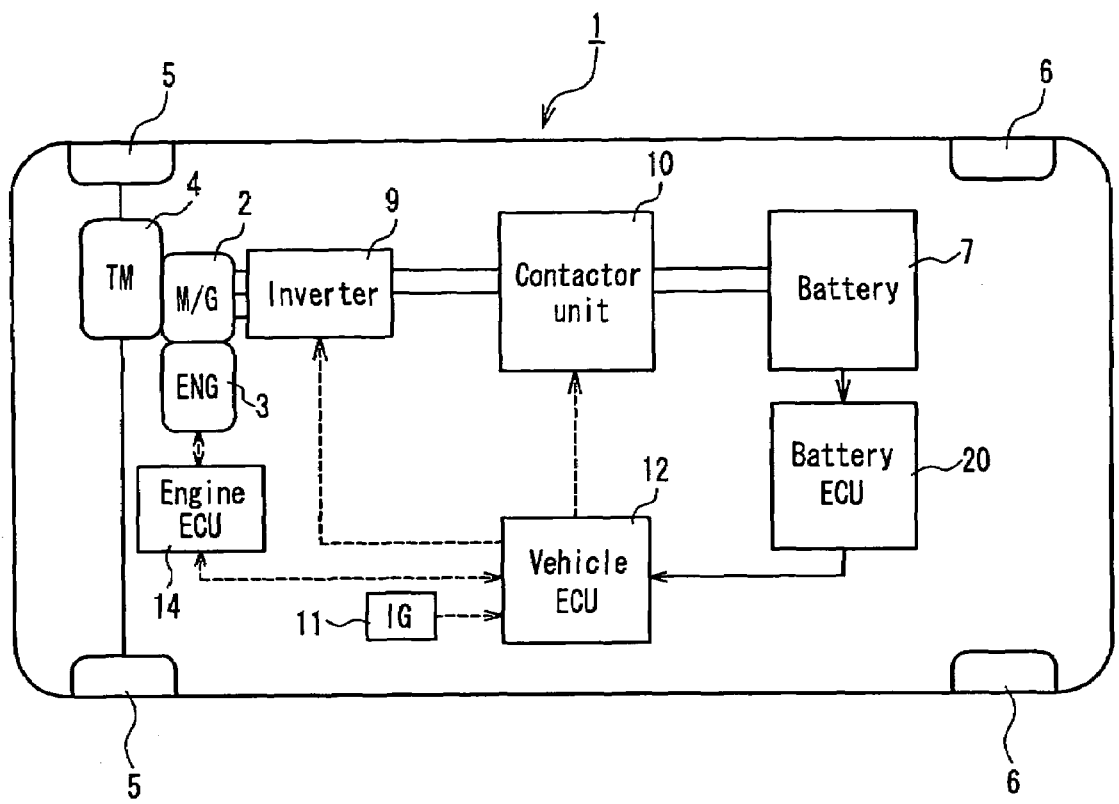
FIG. 1 a diagram showing the overall configuration of a HEV to which a control device of the electric vehicle according to an embodiment of the present invention is applied.

FIG. 1 is a diagram showing the overall configuration of a HEV serving as the electric vehicle according to an embodiment of the present invention. In FIG. 1, the HEV 1 has a pair of left and right front wheels 5 and 5, which are driving wheels, to which an output of a motor generator (M/G) 2 or an engine (ENG) 3 is transmitted via a transmission (TM) 4, and a pair of left and right rear wheels 6 and 6. A battery pack 7 that is mounted at the rear of the HEV 1 and that outputs, for example, a voltage of 360 V is connected to the motor generator 2 via a contactor unit 10 and an inverter 9. ON/OFF signals of an ignition key switch (IG) 11 are supplied to a vehicle electronic control unit (hereinafter, abbreviated as "vehicle ECU") 12, and the vehicle ECU 12 controls the contactor unit 10, the inverter 9, and an engine electronic control unit (hereinafter, abbreviated as "engine ECU") 14. Moreover, the engine 3 is controlled by the engine ECU 14. A battery electronic control unit (hereinafter, "battery ECU") 20 receives information, such as the cell voltage, the charge and discharge current, and the cell temperature, from the battery pack 7 for each block of the battery modules, estimates the state of charge (SOC, also referred to as "charge level") of the battery pack 7, and sends information, such as the charge requirement, the discharge requirement, the SOC, and the battery voltage, to the vehicle ECU 12.

Figure 2:
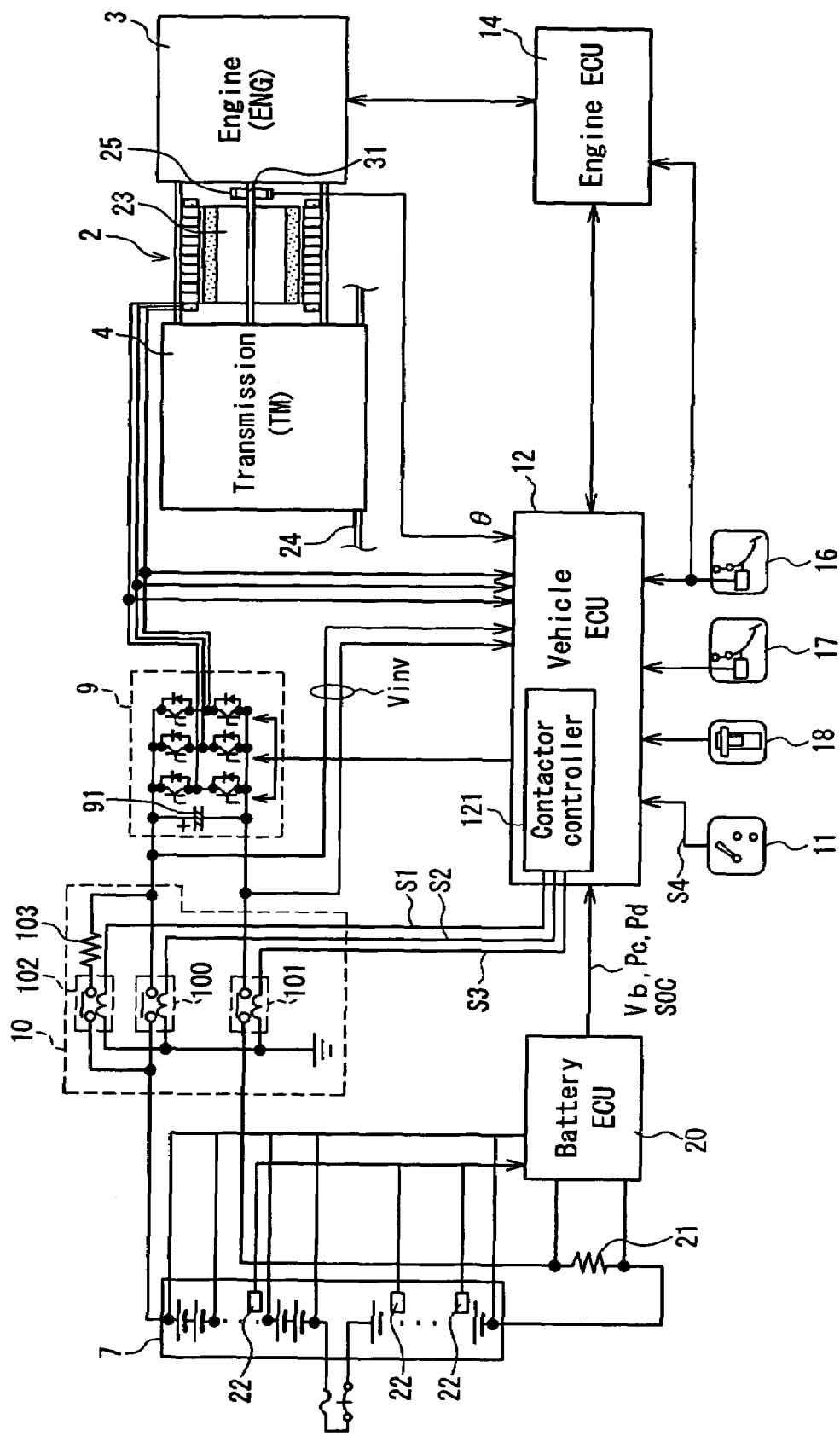
FIG. 2 is a functional block diagram showing the configuration of the control system in FIG. 1 in greater detail.

FIG. 2 is a functional block diagram showing the configuration of the control system in FIG. 1 in greater detail.

In FIG. 2, a rotor 23 of the motor generator 2 is connected to an output shaft 31 of the engine 3, and the output shaft 31 supplies an input to the transmission 4. The motor generator 2 functions as a three-phase ac generator or a three-phase ac motor. The transmission 4 decreases the rotating speed of the output shaft 31 of the engine 3 via an internal gear, and a driving force is connected via a differential to a drive shaft 24 to which the driving wheels 5 and 5 (FIG. 1) are coupled at both ends. With the above-described structure, the output of the engine 3 or the motor generator 2 is transmitted to the driving wheels 5 and 5, and thus the HEV 1 is driven.

The output and the rotating speed of the engine 3 are controlled by the engine ECU 14 according to the amount that an accelerator pedal 16 is operated, environmental conditions, such as the coolant temperature, the intake air temperature, and the intake pressure, engine information from a crank sensor and a knock sensor, and the operating state of the motor generator 2.

Figure 8:
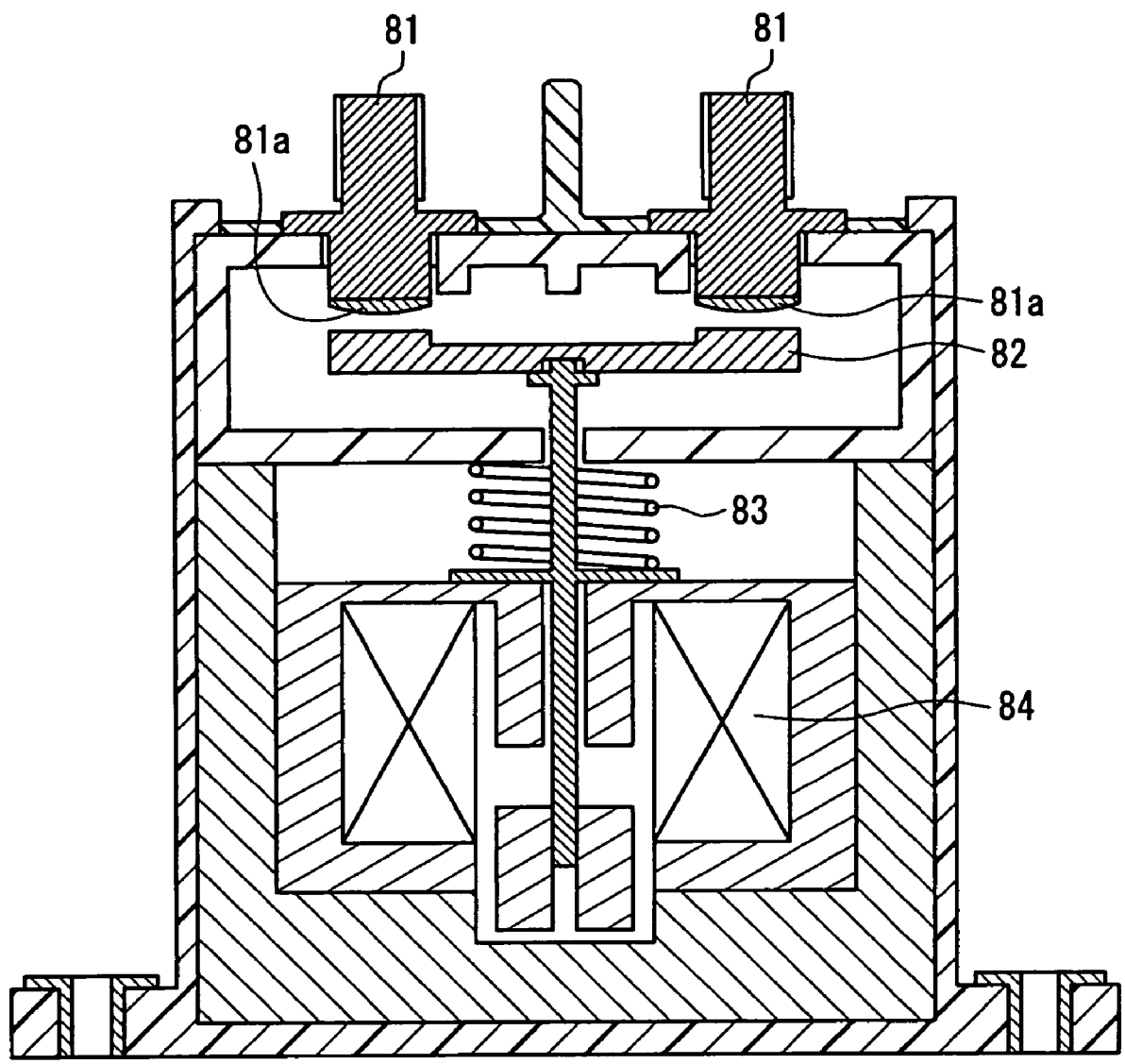
FIG. 8 is a lateral cross-sectional view showing the configuration of a main contactor.

As shown in FIG. 2, the battery pack 7 is constituted by a plurality of cells or battery modules that are connected together in series, and is connected to the inverter 9 via the contactor unit 10. The contactor unit 10 is constituted by a positive side main contactor 100 (a contact switching device on the positive side), which is connected between a positive electrode terminal of the battery pack 7 and a high potential input terminal of the inverter 9, a negative side main contactor 101 (a contact switching device on the negative side), which is connected between a negative electrode terminal of the battery pack 7 and a low potential input terminal of the inverter 9, and a precharge circuit, which is constituted by a precharge contactor 102 and a current-limiting resistance 103 that are connected in series, and which is connected in parallel with the positive side main contactor 100 in order to precharge a smoothing capacitor 91 in the inverter 9 when starting the vehicle. The positive side main contactor 100, the negative side main contactor 101, and the precharge contactor 102 have the same structure and functions as the conventional main contactor that is described above with reference to FIG. 8.

Contacts of the positive side main contactor 100, the negative side main contactor 101, and the precharge contactor 102 (hereinafter, these are also referred to collectively as "contactors") are open when a starting voltage (minimum operating voltage) is not supplied from the vehicle ECU 12, and they are closed when the starting voltage is supplied.

When the vehicle ECU 12 closes the contacts of the precharge contactor 102 and the negative side main contactor 101, the smoothing capacitor 91 is precharged, and when the voltage difference between the battery voltage Vb and the inverter side voltage Vinv becomes a specified value or less, contactor controller 121 in the vehicle ECU 12 determines that the precharge is completed, and then, the contact of the positive side main contactor 100 is closed, and thus electric power is supplied from the battery pack 7 to the motor generator 2 via the inverter 9.

In the present embodiment, the secondary cells that constitute the battery pack 7 may be battery modules made of nickel-metal hydride battery. The motor generator 2 is controlled by the inverter 9, and sends and receives electric power to and from the battery pack 7 via the inverter 9.

The inverter 9 is controlled by the vehicle ECU 12, and this control is based on, for example, information about the operating state of the engine 3 from the engine ECU 14, the amount that the accelerator pedal 16 is operated, the amount that a brake pedal 17 is operated, the shift range that is set using a shift lever 18, information about the battery pack 7, such as the SOC or failure, from the battery ECU 20, the angle θ of rotation of the output shaft 31 of the engine 3 that is detected by a resolver 25, and the currents Iu, Iv, and Iw of the phases U, V, and W of the motor generator 2.

Based on this information, the vehicle ECU 12 outputs signals for controlling transistors constituting the inverter 9. Then, the vehicle ECU 12 controls the field current of the motor generator 2 according to the rotating speed at the time and decides whether to let the motor generator 2 function as a generator or as a motor. When the motor generator 2 functions as a generator, the battery pack 7 is charged, whereas when the motor generator 2 functions as a motor and uses electric power, electric power is discharged from the battery pack 7.

For example, when the battery ECU 20 detects a decrease in the SOC of the battery pack 7, it lets, via the vehicle ECU 12 and the inverter 9, the motor generator 2 produce electric power using a part of the torque that is produced by the engine 3, and thus, the battery pack 7 is charged. Moreover, when the battery ECU 20 detects an increase in the SOC of the battery pack 7, the vehicle ECU 12 reduces the output of the engine 3 via the engine ECU 14 and lets the motor generator 2 function as a motor via the inverter 9, and thus the torque that is produced is used to drive the vehicle. Furthermore, during braking of the vehicle, the vehicle ECU 12 lets the motor generator 2 function as a generator, and the electric power thus produced is used to charge the battery pack 7.

Since it is difficult to predict when braking of the HEV 1 is performed, it is desirable that the battery pack 7 is adapted to sufficiently accept the electric power that is produced by braking. On the other hand, when an acceleration that a driver desires cannot be achieved only with the output of the engine 3, the SOC of the battery pack 7 needs to be at a certain level so that the motor generator 2 can be made to function as a motor. In order to satisfy such requirements, the SOC of the battery pack 7 generally is controlled to be at about half of the battery capacity (about 60%) at all times.

In the case of a HEV in which electric power is produced by the output of the engine 3 and the cells are charged with that electric power, the HEV is configured such that, by controlling the SOC of the battery pack 7 appropriately, regenerative electric power during braking is sufficiently recovered to increase the energy efficiency, and when accelerating, an acceleration that the driver desires can be achieved.

In this manner, it is important for vehicles that employ a cell as a power source, such as HEVs, to detect the SOC of the battery pack 7 with accuracy and control the SOC appropriately. For this reason, the cell voltage, the charge and discharge current, and the cell temperature, which are information about the state of the cells constituting the battery pack 7, are input to the battery ECU 20, and the SOC and failure of the battery pack 7 are estimated arithmetically. The cell voltage is detected for each of a plurality of blocks into which the battery pack 7 is divided, and then input to the battery ECU 20 as a voltage signal for each block. Moreover, the cell temperature is detected by temperature sensors 22 that are provided at a plurality of positions because the cell temperature varies from place to place. A thermistor is used as the temperature sensors 22, and the value of resistance that changes depending on the temperature is converted into a voltage value, and then input to the battery ECU 20.

Moreover, in order to detect the charge and discharge current of the battery pack 7, a current-detecting resistance 21 that is connected to the battery pack 7 in series is provided, and a fine voltage that is generated at both ends of the current-detecting resistance 21 during charging or discharging of the battery pack 7 is input to the battery ECU 20, and a current value is calculated. In the present embodiment, a configuration in which the charge and discharge current of the battery pack 7 is detected using the current-detecting resistance 21 is employed. However, it is also possible to employ a configuration in which an electromagnetic field that is generated by a current that flows through an electric wire during charging or discharging of the battery pack 7 is detected by a Hall element, converted into a voltage signal and then sent to the battery ECU 20.

Based on the three types of information, that is, the cell voltage, the charge and discharge current, and the cell temperature, the battery ECU 20 outputs a charge and discharge electric power that can be accepted by the battery pack 7 to the vehicle ECU 12 as a discharge permissible value Pd, a charge permissible value Pc, and a battery voltage value Vb. For example, when the SOC of the battery pack 7 decreases, the battery ECU 20 reduces the discharge permissible value Pd and thus induces an increase in the SOC as a result. On the other hand, under a condition in which the SOC is high, the battery ECU 20 reduces the charge permissible value Pc and thus induces a decrease in the SOC as a result.

Moreover, the battery ECU 20 outputs the value of the SOC to the vehicle ECU 12, and the vehicle ECU 12 attempts to balance charge and discharge such that this value is in an intermediate range of the SOC, for example, to an SOC of around 60%. Moreover, at low temperatures, the internal resistance of the cells increases and input and output are significantly restricted, and thus, the battery ECU 20 causes both of the charge permissible value Pc and the discharge permissible value Pd to be reduced. Moreover, when the battery voltage Vb decreases, the discharge permissible value Pd is reduced in order to prevent excessive discharging of the cells, whereas when the battery voltage Vb increases, the charge permissible value Pc is reduced in order to inhibit generation of a gas inside the cells. Furthermore, the charge permissible value Pc and the discharge permissible value Pd are restricted also when the internal resistance increases because the entire battery pack 7 is broken, or when the internal resistance increases because the battery pack 7 comes to the end of its life.

Although not shown in FIG. 2, the contactor controller 121 that is contained in the vehicle ECU 12 is constituted by a CPU, software that is written to a memory in the CPU, and a peripheral circuit. It receives the value of the battery voltage Vb, the value of the inverter side voltage Vinv (the value of a voltage that is applied on the inverter side relative to the contactor unit 10), and an ignition key signal S4 for indicating ON/OFF of the ignition key 11, and supplies starting voltage signals S2, S3, and S1 to the positive side main contactor 100, the negative side main contactor 101, and the precharge contactor 102, respectively.

The contactor controller 121 compares the value of the battery voltage Vb with the value of the inverter side voltage Vinv, and when the contactors are not turned ON but the value of the battery voltage Vb is equal to the value of the inverter side voltage Vinv, it determines that a failure has occurred in the contacts of the contactors due to welding (short-circuiting).

Figure 3:
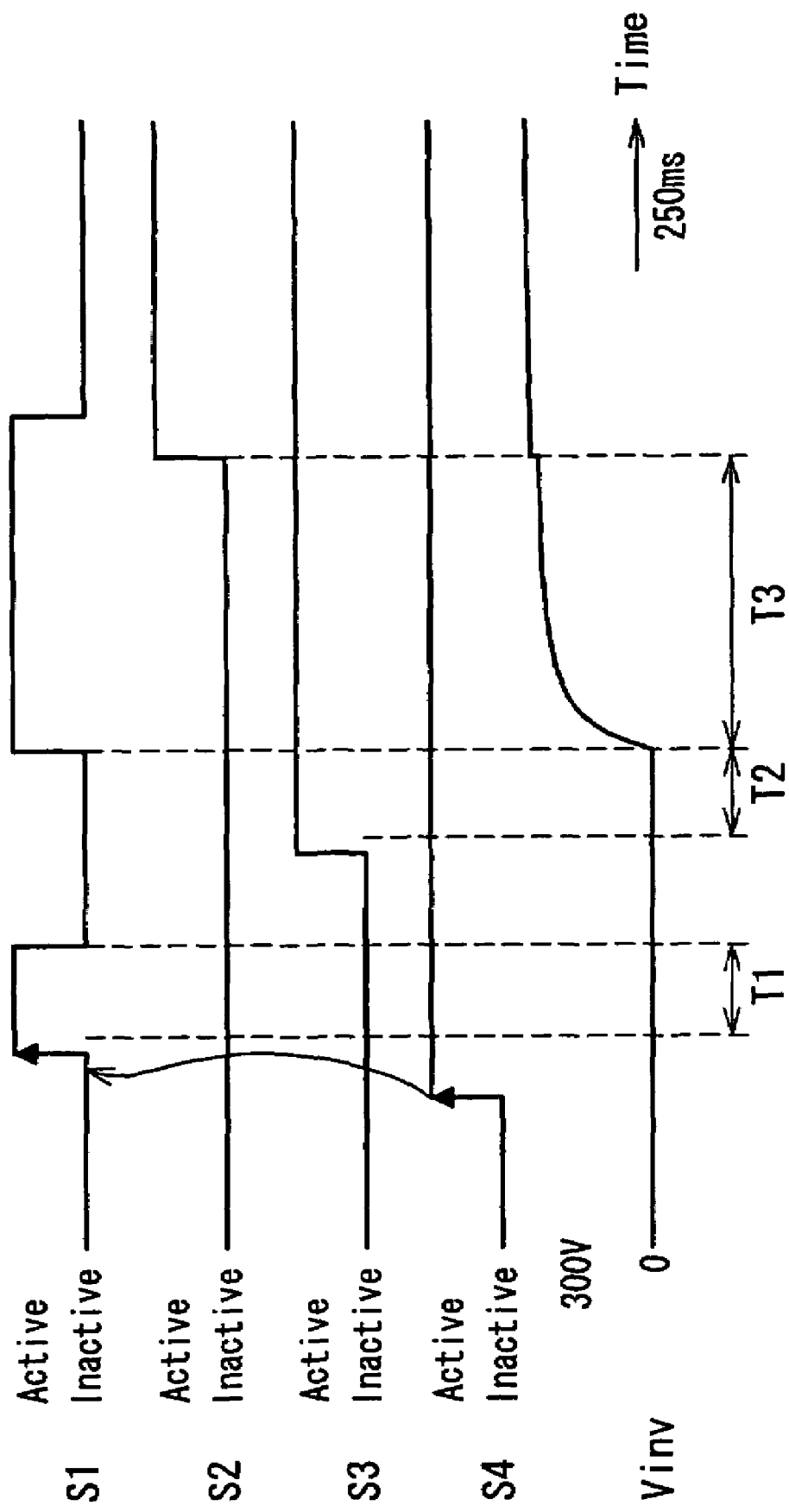
Figure 4:
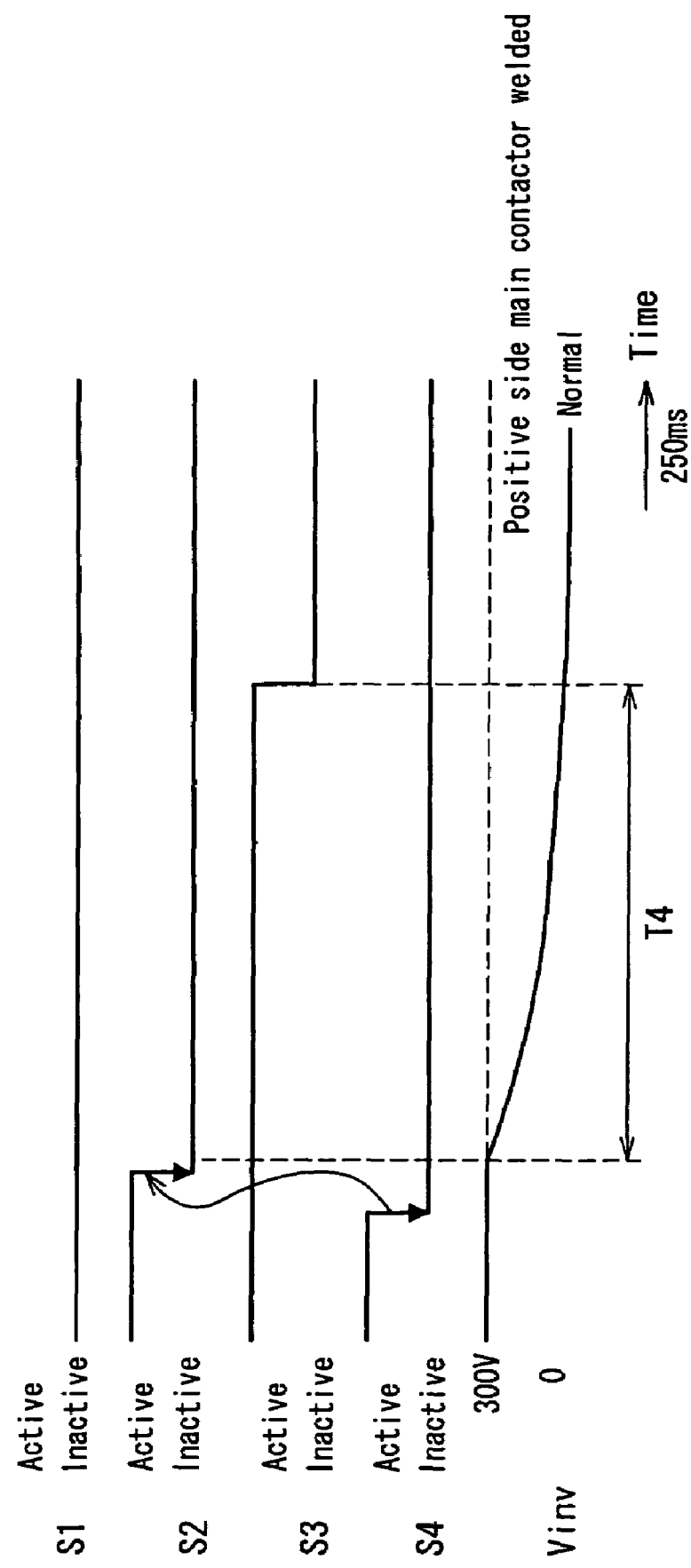
FIG. 4 is a timing chart of the precharge contactor starting control signal S1, the positive side main contactor starting control signal S2, the negative side main contactor starting control signal S3, the ignition key signal S4, and the inverter side voltage Vinv when the ignition key 11 is OFF.

Next, an operation for controlling the contactor unit 10 by the vehicle ECU 12 will be described with reference to FIGS. 3 and 4. FIGS. 3 and 4 are timing charts of the precharge contactor starting control signal S1, the positive side main contactor starting control signal S2, the negative side main contactor starting control signal S3, the ignition key signal S4, and the inverter side voltage Vinv in the cases where the ignition key 11 is turned ON and OFF, respectively.

First, when the driver turns the ignition key 11 from OFF to ON, the ignition key signal S4 enters into an active state, as shown in FIG. 3, and the contactor controller 121 activates the precharge contactor starting control signal S1 to turn ON only the precharge contactor 102, performs a weld check to check whether or not the negative side main contactor 101 is defective due to welding (time period T1), and then, inactivates the precharge contactor starting control signal 1 to turn OFF the precharge contactor 102.

Next, the contactor controller 121 activates the negative side main contactor starting control signal S3 to turn ON only the negative side main contactor 101, and performs a weld check to check whether or not the positive side main contactor 100 is defective due to welding (time period T2). Immediately after that, the contactor controller 121 activates the precharge contactor starting control signal S1 to also turn ON the precharge contactor 102. Since the negative side contactor 101 is ON, the smoothing capacitor 91 in the inverter 9 is charged with a current that flows from the battery pack 7 via the precharge circuit in which the precharge contactor 102 and the current-limiting resistance 103 are connected in series, and thus, the inverter side voltage Vinv increases (time period T3).

After this predetermined time period T3, if the voltage difference between the battery voltage Vb and the inverter side voltage Vinv is a specified value or less, then the contactor controller 121 determines that precharging is finished, and activates the positive side main contactor starting control signal S2 to turn ON the positive side main contactor 100, and then, inactivates the precharge contactor starting control signal S1 to turn OFF the precharge contactor 102. At this time, since the voltage difference between the battery voltage Vb and the inverter side voltage Vinv is small, the inrush current to the smoothing capacitor 91 is small even when the positive side main contactor 100 is turned ON, and thus, there is virtually no risk of damage, for example, welding the positive side main contactor 100.

It should be noted that even when the time period T3 has elapsed, if the inverter side voltage Vinv has not increased to a specified voltage, then it is determined that there is a failure, and all of the contactors are turned OFF.

When the HEV finishes running and the driver turns the ignition key 11 from ON to OFF, the ignition key signal S4 enters into an inactive state, as shown in FIG. 4, and the contactor controller 121 inactivates the positive side main contactor starting control signal S2 to turn OFF the positive side main contactor 100. Although not shown in FIG. 2, a discharging resistance for the smoothing capacitor 91 is connected to the inverter 9 in parallel, so that the residual charge in the smoothing capacitor 91 is discharged. If the inverter side voltage (the terminal voltage of the smoothing capacitor 91) Vinv does not decrease to a predetermined voltage at the time when a predetermined time period T4 has elapsed, the contactor controller 121 determines that the positive side main contactor 100 is defective due to welding.

Here, the case where another vehicle collides with the vehicle while the vehicle is parked and the ignition key is OFF will be described. There are the two contactors, the positive side main contactor 100 and the negative side main contactor 101, between the battery pack 7 and the inverter 9. Since the voltage of the smoothing capacitor 91 in the inverter 9 is zero because the electric charge has been discharged by the discharging resistance, if the two contactors are simultaneously turned ON upon impact of the collision, then an inrush current having a value that can be expressed by I=Vb/R ((battery voltage)/(internal resistance of battery+wiring resistance)) flows according to Ohm's law.

When the terminal voltage (battery voltage) Vb of the battery pack 7 shown in FIG. 2 is 360 volts, the internal resistance of the battery pack 7 is 0.3 ohms, and the wiring resistance is neglected because it is significantly smaller than the internal resistance of the battery pack 7, the inrush current I is 1200 amperes. This value of the inrush current I is a current value that is sufficient for the contacts of the main contactors to be welded, giving consideration to the fact that usually, the rated current of main contactors for HEVs is several tens of amperes. Therefore, conventionally, in order to prevent such a failure due to welding, it has been necessary to increase the spring force of the shaft spring (83 in FIG. 8) for fixing the moving contact (82 in FIG. 8) of the main contactor in the OFF position when the main contactor is OFF.

On the other hand, it has been necessary to push the moving contact against the terminal electrodes with a strong electromagnetic force because the terminal electrodes (81a in FIG. 8) of the main contactor and the moving contact should not be separated upon strong impact (usually, about 10 G: G represents the gravitational acceleration) that occurs, for example, when the vehicle goes over a bump while running. Since the aforementioned spring force is 180 degrees from this electromagnetic force, that is to say, the direction of the spring force is opposite to the direction of the electromagnetic force, if the required spring force is increased, then it is necessary to also increase the electromagnetic force that is produced by the electromagnetic coil (84 in FIG. 8). Thus, conventionally, the approach of increasing the number of turns of the winding in the electromagnetic coil, the approach of increasing the winding diameter as a countermeasure against heat generation caused by the copper loss of the winding and for the purpose of increasing the magnetomotive force, or the like has been employed.

Figure 5:
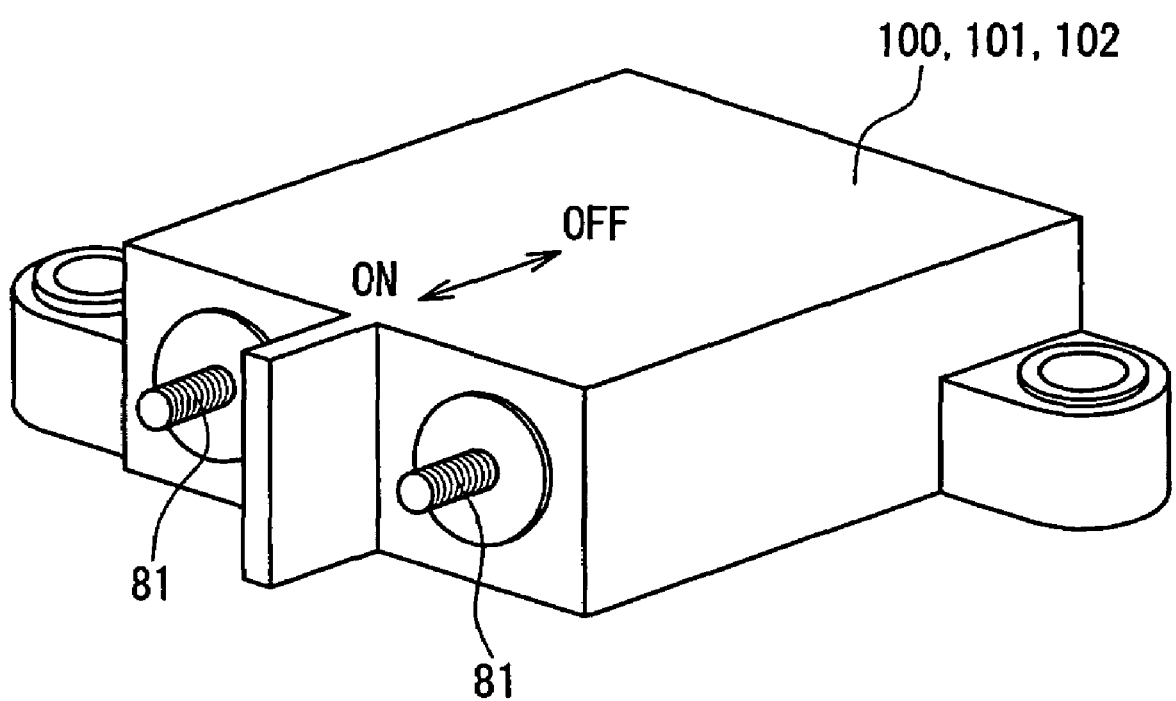
FIG. 5 is a perspective view showing the appearance of each of contactors, which are contact switching devices mounted on the HEV that is the electric vehicle according to an embodiment of the present invention.

FIG. 5 is a perspective view showing the appearance of the contactors 100, 101, and 102, which are the contact switching devices mounted on the HEV that is the electric vehicle according to an embodiment of the present invention. In FIG. 5, as shown by the two-directional arrow for indicating the direction in which the moving contact is moved forward and backward, when the moving contact (not shown) comes into contact with the terminal electrodes 81a, the contactor is turned ON, and when the moving contact is separated from the terminal electrodes 81a, the contactor is turned OFF.

Figure 6:
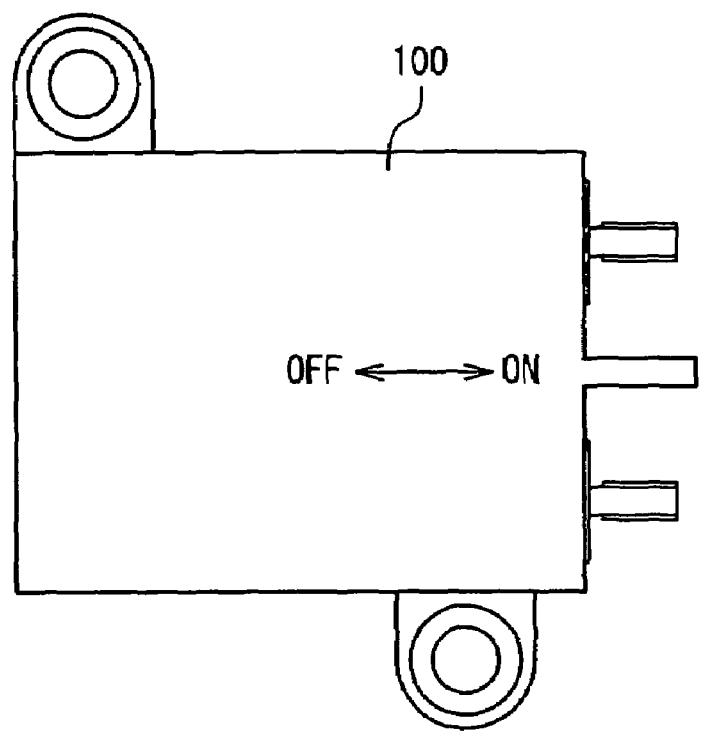
FIG. 6 is a plan view showing an example of an arrangement of the positive side main contactor and the negative side main contactor in FIG. 5.
Figure 6:
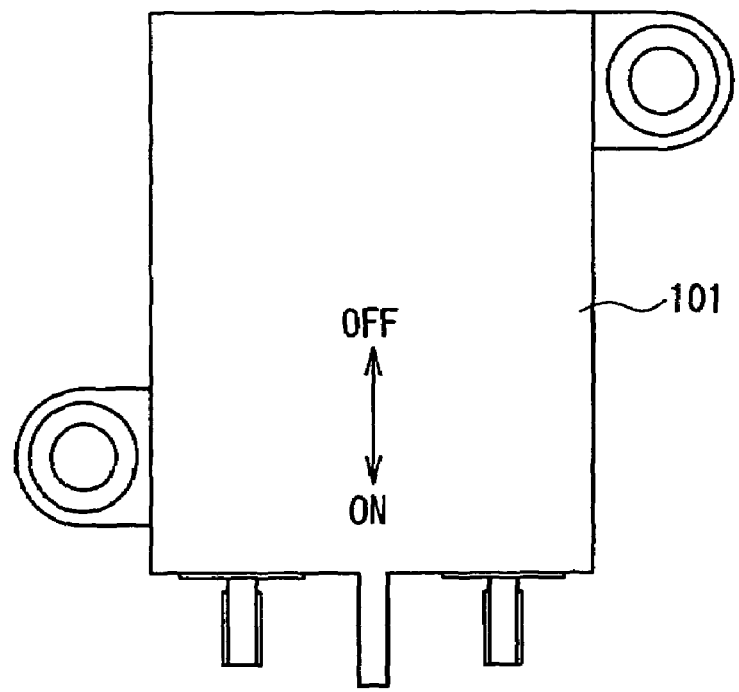

FIG. 6 is a plan view showing an example of an arrangement of the positive side main contactor 100 and the negative side main contactor 101 in FIG. 5. As shown in FIG. 6, the positive side main contactor 100 and the negative side main contactor 101 are arranged so that their moving contacts are moved forward and backward in directions (shown by the two-directional arrows) that are 90 degrees from each other. Thus, the moving contacts of the positive side main contactor 100 and the negative side main contactor 101 are not welded to the terminal electrodes at the same time upon external impact, and it is possible to achieve the same impact resistance as was previously possible with a smaller spring force ($\frac{1}{2}^{1/2}$) than was previously required. Therefore, it is possible, for example, to reduce the number of turns of the winding in the electromagnetic coil or to reduce the winding diameter, and the size and the cost of the main contactors can be reduced while maintaining the reliability of the main contactors.

Figure 7:
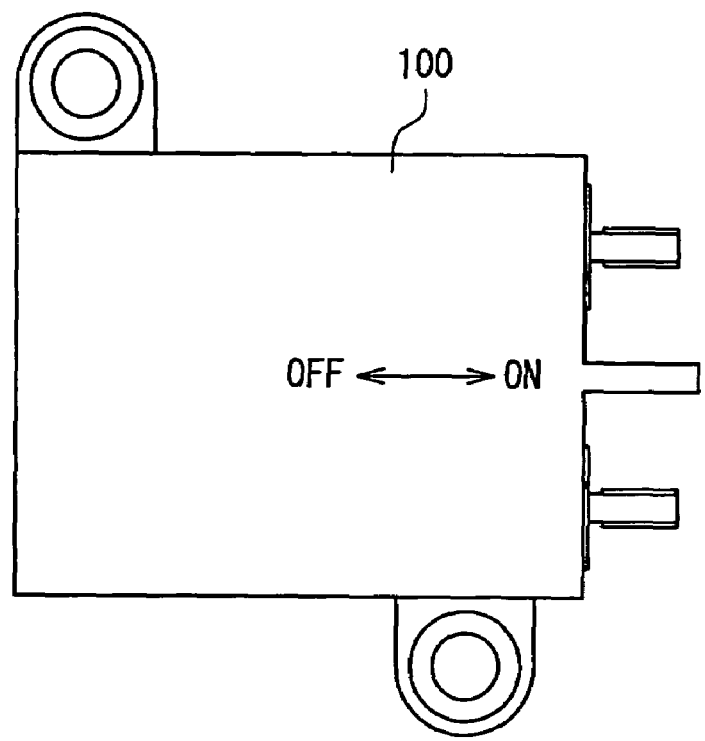
FIG. 7 is a plan view showing another example of the arrangement of the positive side main contactor and the negative side main contactor in FIG. 5.
Figure 7:
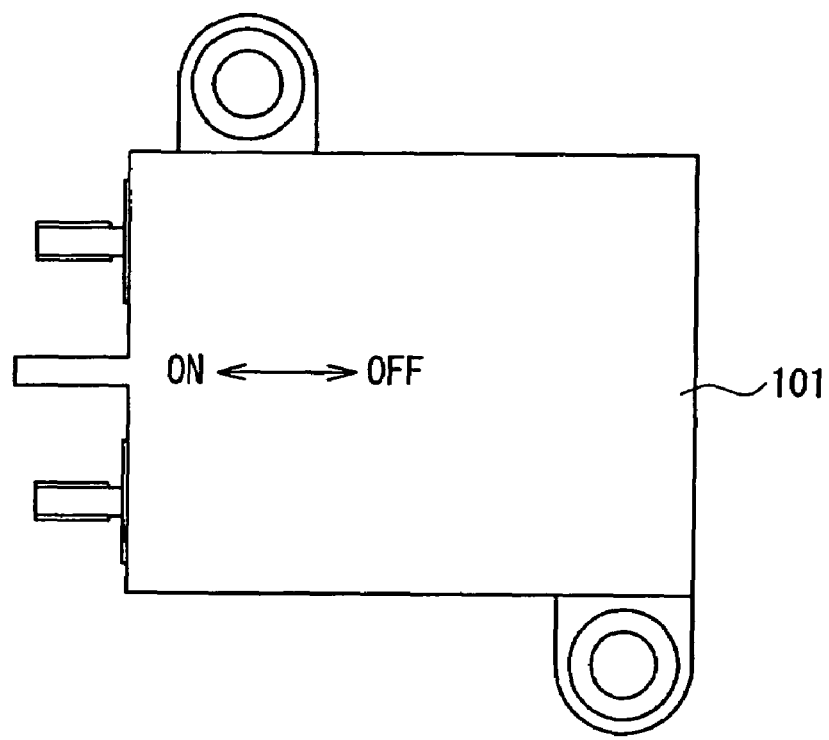

FIG. 7 is a plan view showing another example of the arrangement of the positive side main contactor 100 and the negative side main contactor 101 in FIG. 5. As shown in FIG. 7, the positive side main contactor 100 and the negative side main contactor 101 are arranged so that their moving contacts are moved forward and backward in directions (shown by the two-directional arrows) that are 180 degrees from each other, that is to say, they are arranged in opposite orientations. In this case, it is possible to achieve the same impact resistance as was previously possible with a very small spring force that is required for pushing back the moving contact from the terminal electrodes quickly.

The electric vehicle according to the present invention has the advantage that it can be equipped with a contact switching device that is designed so that the size and the cost of the contact switching device are reduced while maintaining reliability, and is useful for electric vehicles such as electric vehicles (PEVs) and hybrid electric vehicles (HEVs), in particular hybrid electric vehicles having a fuel cell and a secondary cell.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An electric vehicle that runs by converting a dc power from a battery pack comprising a plurality of secondary cells into an ac power using an inverter and supplying the ac power to a motor,
   wherein the electric vehicle comprises at least two contact switching devices that are provided between the battery pack and the inverter,
   wherein each of the contact switching devices comprises a pair of terminal electrodes arranged along a first direction, a moving contact for contacting the pair of terminal electrodes,
   and moving contact driving means for moving the moving contact forward and backward with respect to the pair of terminal electrodes along a second direction perpendicular to the first direction, and
   wherein the at least two contact switching devices are arranged so that their moving contacts are moved forward and backward in different directions from each other.

2. The electric vehicle according to claim 1,
   wherein the at least two contact switching devices comprise:
   a positive side contact switching device that is connected between a positive electrode terminal of the battery pack and a high potential input terminal of the inverter, and
   a negative side contact switching device that is connected between a negative electrode terminal of the battery pack and a low potential input terminal of the inverter, and
   wherein the positive side contact switching device and the negative side contact switching device are arranged so that their moving contacts are moved forward and backward in directions that are 90 degrees from each other.

3. The electric vehicle according to claim 1,
   wherein the at least two contact switching devices comprise:
   a positive side contact switching device that is connected between a positive electrode terminal of the battery pack and a high potential input terminal of the inverter, and
   a negative side contact switching device that is connected between a negative electrode terminal of the battery pack and a low potential input terminal of the inverter, and
   wherein the positive side contact switching device and the negative side contact switching device are arranged so that their moving contacts are moved forward and backward in directions that are 180 degrees from each other.

4. An electric vehicle that runs by converting a dc power from a battery pack comprising a plurality of secondary cells into an ac power using an inverter and supplying the ac power to a motor, the electric vehicle comprising:
   a battery pack having a positive electrode terminal and a negative electrode terminal;
   an inverter having a high potential input terminal and a low potential input terminal;
   a first contact switching device that is connected between the positive electrode terminal and the high potential input terminal, the first contact switching device including:
   a first pair of terminal electrodes arranged along a first direction;
   a first moving contact; and
   a first moving contact driving means for moving the first moving contact forward and backward with respect to the first pair of terminal electrodes along a second direction perpendicular to the first direction; and
   a second contact switching device that is connected between the negative electrode terminal and the low potential input terminal, the second contact switching device including:
   a second pair of terminal electrodes arranged along a third direction that differs from the first direction;
   a second moving contact; and
   a second moving contact driving means for moving the second moving contact forward and backward with respect to the second pair of terminal electrodes along a fourth direction perpendicular to the third direction.

5. The electric vehicle as described in claim 4, wherein the fourth direction is one of 90 degrees or 180 degrees from the second direction.

* * * * *